March 3, 1970 H. KADEN 3,499,118

DEVICE FOR SWITCHING STEREOPHONIC SIGNALS

Filed Sept. 2, 1966 2 Sheets-Sheet 1

INVENTOR.
HELMUT KADEN
BY
Frank R. Jifani
AGENT

INVENTOR.
HELMUT KADEN
BY
Frank R. Trifari
AGENT

United States Patent Office 3,499,118
Patented Mar. 3, 1970

3,499,118

DEVICE FOR SWITCHING STEREOPHONIC SIGNALS

Helmut Kaden, Hamburg-Rahlstedt, Germany, assignor, by mesne assignments, to U.S. Philips Corporation, New York, N.Y., a corporation of Delaware Filed Sept. 2, 1966, Ser. No. 577,012

Claims priority, application Germany, Sept. 3, 1965, P 37,592

Int. Cl. H04j *1/02*

U.S. Cl. 179—15 6 Claims

ABSTRACT OF THE DISCLOSURE

A modulating or demodulating switch for stereo signals. The electronic switch is switched at a frequency of 38 kHz. Because of the forward internal resistance of the switch; a residual signal will be present. Therefore a signal in phase opposition is added to cancel out this residual signal. The cancelling signal is obtained from a variable resistor in the emitter circuit of a transistor amplifier to permit adjustment.

The invention relates to a device for producing stereo-signals on the principle of the so-called switching process. Such devices are employed for testing stereophonic receivers.

The invention has for its object to provide a device of the kind set forth, which is simple of construction and nevertheless fulfills the requirement that only a small residue of the 38 kc./s. auxiliary carrier frequency should be present in the stereo-signal (less than 1%). Moreover, the device according to the invention has the advantage that not only the left-hand signal or the right-hand signal is available but also the two signals may appear simultaneously in phase opposition. Particularly in testing so-called matrix decoders this property is important.

In the review "Funk-Technik," vol 7/63, pages 206–208 there is described a stereo-signal generator operating on the switching process principle, a so-called Cowan modulator. In this modulator the switch is switched over with a frequency of 38 kc./s. periodically and the switch is formed by a bridge circuit of silicon diodes, which circuit is controlled as a two-terminal network. The signal sources for the left-hand and the right-hand channels are connected to earth alternately by means of two of these diode switches.

This known device is equipped with tubes and operates on high-ohmic outputs, so that comparatively high output voltages become available. It is not essential in this case that upon a short-circuit of the signal sources by means of the diode switches a slight residual voltage is left, which may be attributed to the non-negligible resistance of the diode in the forward direction and which appears as an interference voltage in the other channel. In view of the comparatively high output voltages, the influence of the residual voltage in percent is negligible.

However, difficulties arise, if it is desired to equip this known, comparatively simple arrangement with transistors, since in transistor arrangements only low voltages are available, whilst the outputs are low-ohmic. As a consequence, the residual voltage appears comparatively to a much greater extent, so that it is necessary to take steps for suppressing this residual voltage.

The device for producing stereo-signals according to the invention is characterized in that the residual voltage appearing across the switch is compensated by a voltage in phase opposition.

The invention and its advantages will now be described more fully with reference to the figures.

Figure 1:
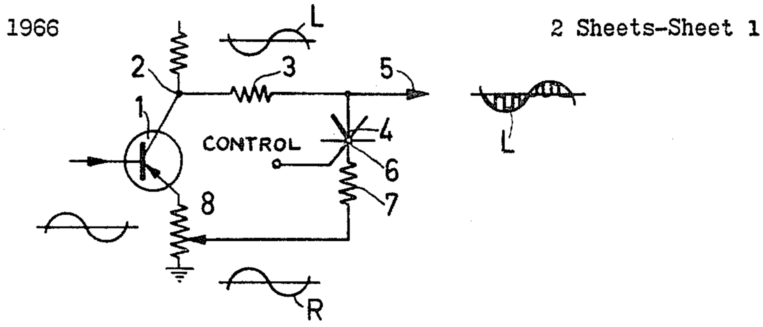
FIG. 1 shows a basic diagram according to the invention for testing one channel and FIG. 2 shows a circuit arrangement of this device for testing the two channels by the same signal.

In the device shown in FIG. 1 the low-frequency input signal applied to the base of a transistor 1 appears in phase opposition at point 2. The resistor 3 is followed by a switch 4, which short-circuits the output 5 in the the rhythm of the 38 kc./s. auxiliary carrier frequency so that at the output 5 only "half" the signal, for example the left-hand signal L would appear, if upon the short-circuit a zero voltage would be found at point 6. Owing to the unavoidable resistance 7 of the switch 4 in the forward direction (illustrated here symbolically as a mechanical switch, but formed in fact as stated above by a diode bridge circuit), no complete short-circuit is obtained; even when the switch is cut off, a residual voltage is left at the output 5. However, if in accordance with the invention a voltage derived from the emitter resistor 8 is applied to the switch 4, this voltage of appropriate value, which is in phase opposition to the signal voltage at point 2, is capable of compensating for the interfering residual voltage.

Figure 2:
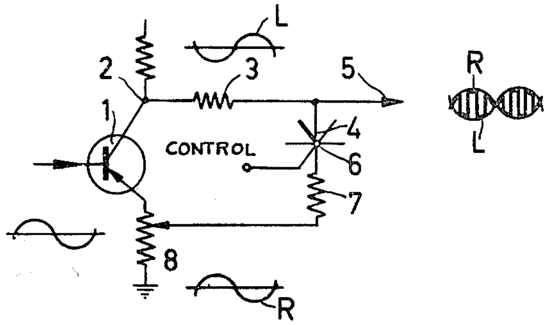

This measure provides a futher advantage. If a higher voltage than required for the compensation is derived from the resistor 8, as is indicated in FIG. 2 by the upwardly shifted tapping of the resistor 8, the two signals, that is to say the left-hand signal and the right-hand signal appear in phase opposition at the output 5.

Figure 3:
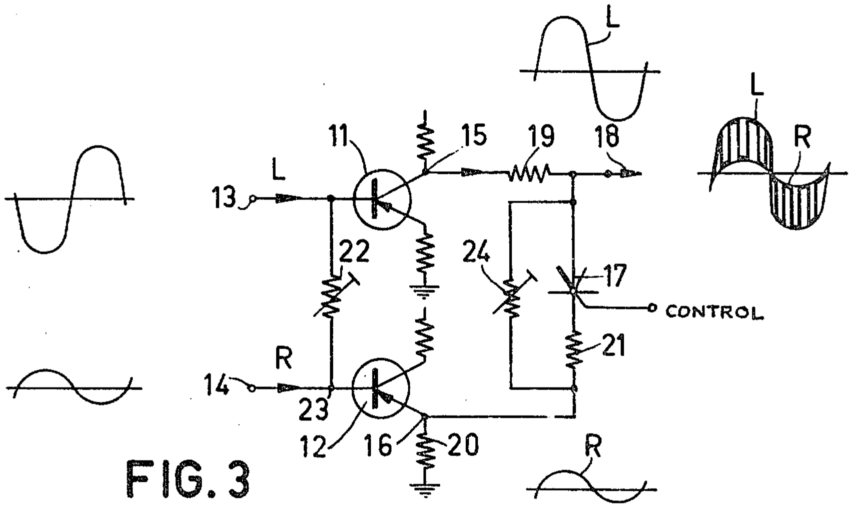
FIG. 3 shows a basic diagram of a device according to the invention for testing the two channels each with a different signal.

If desired for testing purposes, the device shown in FIG. 3 permits of testing the two channels separately. For this purpose the left-hand signal L and the right-hand signal R are applied to the transistors 11 and 12 through the terminals 13 and 14 respectively, which signals also appear at the points 15 and 16 respectively. As long as the switch 17 is open, the left-hand signal L appears at the output 18. When the switch 17 is closed, substantially the whole voltage of the left-hand signal L is operative across the resistor 19, since the resistor 20 is low-ohmic. The low residual voltage appearing across the resistance 21 in the forward direction is compensated by a small part of the left-hand signal L, which appears at point 16 through the resistors 22, point 23 and the transistor 12. Conversely, when the switch 17 is open, a small residual voltage of the right-hand signal R appears at the output 18 via the backward resistance and an equalizing resistor 24, connected in parallel with the switch 17, which residual voltage is compensated by a counter-voltage of point 23 across the resistor 22 and the transistor 11.

Figure 4:
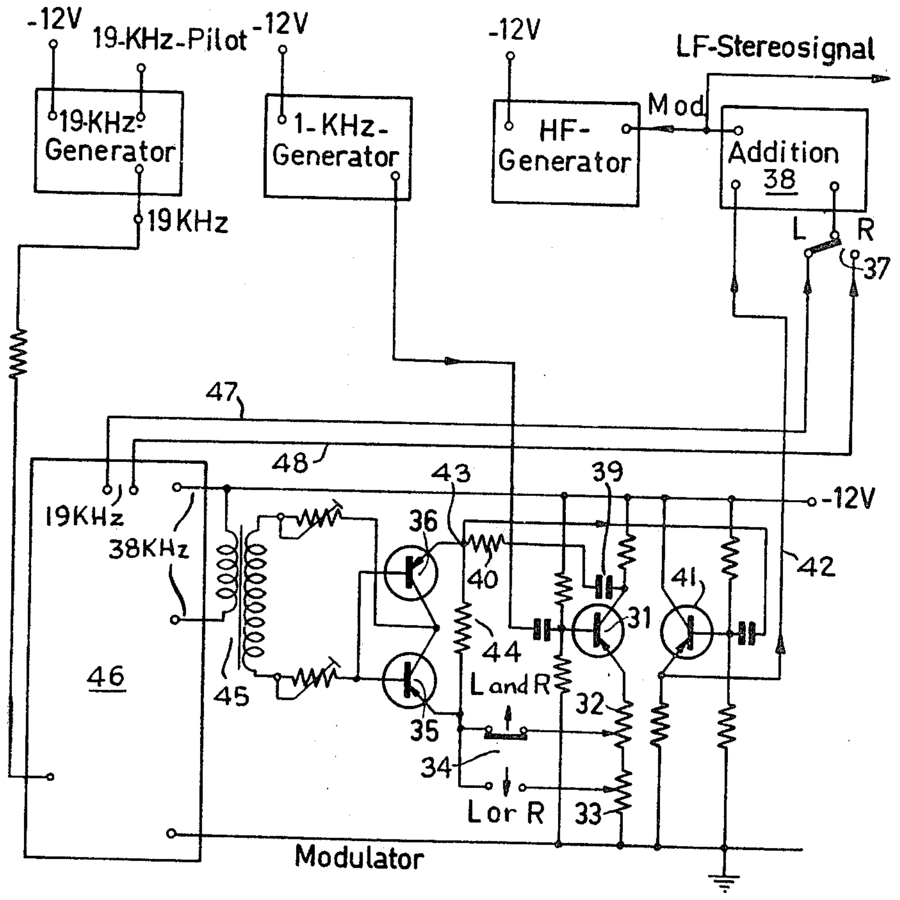
FIG. 4 shows a practical embodiment of the device according to the invention.

The block diagram of FIGURE 4 represents, in general, the conventional structure of a stereo-test signal generator; the block indicated by the word "modulator" comprises a practical embodiment of the invention. An audio signal is fed from the 1 kHz. generator to the base of transistor 31 and then to the block 38 from its collector via components 39–41 and lead 42. Point 43 on this path is also fed with the audio signal in opposite phase via resistor 44 (which corresponds to resistor 24 in FIGURE 3). This is so because the emitter lead of transistor 31 includes tapped load resistors 32 and 33, the values of which have a ratio of about 10:1.

The taps are connected to switch 34, whose two positions result in the application of different voltages to the end of resistor 44. The lower voltage is merely sufficient to neutralize the residual voltage present at point 43 when the switch comprising transistors 35 and 36 is closed so that the left-hand signal or the right-hand signal may be obtained separately at the output of block 38 (which one is obtained depends on the position of the switch 37).

The higher voltage will give both signals simultaneously in opposite phases in a manner similar to that described with reference to FIGURE 2. Indeed the taps on resistors 32 and 33 correspond to the tap positions on resistor 8 in FIGURES 1 and 2 respectively.

The transistors 35 and 36 are driven by a 38 kHz. switching signal derived from transformer 45 so that they both conduct on the same alternate half-cycles, their emitter-collector paths then short-circuiting resistor 44. Transformer 45 is supplied with the output of the 19 kHz. generator, frequency-doubled in block 46. The output of the 19 kHz. generator is also supplied in opposite phases on the leads 47 and 48 to the switch 37.

What is claimed is:

1. A circuit for switching an input signal comprising input terminal means for said signal; output terminal means; switching means coupled to said input terminal means for periodically interrupting said signal; said switching means being characterized by internal forward electrical resistance thereby producing residual components of the said signal during the interruption periods of said signal; means for deriving a compensation signal in phase opposition to said residual signal including a transistor having a base electrode connected to said input terminal means, a collector electrode connected to said switching means, a first resistor means connected to said emitter and having a tap, and a second resistor means connected in series with said first resistor means having a second tap; and means for combining said interrupted signal and said phase opposition signal thereby to compensate said residual signal components including a manual switch coupled to said taps and said output terminal.

2. A circuit as defined in claim 1 wherein the ratio of the first to the second resistances is ten to one.

3. A circuit for switching two input signals comprising first and second input terminals coupled to the two input signals respectively, first and second means for amplifying each having an input and an output, said inputs coupled to said input terminals respectively, said first output being in phase with said first input, said second output being substantially $\pi$ radians out of phase with said second input, varying resistance means coupled between said inputs, an output terminal coupled to one of said outputs, and means for switching having forward resistance coupled between said output terminal and the remaining output, said varying resistance means being adjustable to cancel the residual signal at said output terminal due to said forward resistance when said switching means is closed.

4. A circuit as in claim 3 further comprising a resistor coupled in series between said output terminal and said output to which said output terminal is coupled.

5. A circuit as in claim 3 further comprising a means for varying the resistance across said switching means.

6. A circuit as in claim 3 wherein each of said amplifying means comprises a transistor having an emitter, base and collector electrodes in a common emitter configuration, said first output being the first transistor emitter, said second output being said second transistor collector.

References Cited

UNITED STATES PATENTS

| | | | |
|---|---|---|---|
| 3,139,590 | 6/1964 | Brown | 330—9 |
| 3,167,615 | 1/1965 | Wilhelm et al. | |
| 3,226,481 | 12/1965 | Wilson et al. | |
| 3,233,121 | 2/1966 | Chou | 330—51 X |
| 3,243,607 | 3/1966 | Matsumoto | 307—240 |
| 3,284,641 | 11/1966 | St. John | 307—297 |
| 3,287,620 | 11/1966 | Tuszynski | 332—9 |
| 3,360,745 | 12/1967 | Kretzmer | 325—164 |

KATHLEEN H. CLAFFY, Primary Examiner

C. JIRAUCH, Assistant Examiner